US008997191B1

(12) United States Patent  
Stark et al.

(10) Patent No.: US 8,997,191 B1  
(45) Date of Patent: *Mar. 31, 2015

(54) GRADUAL TEMPLATE GENERATION

(75) Inventors: Yvonne J. Stark, North Bend, WA (US); Mechthild Reginu Kellas-Dicks, Coquitlum (CA)

(73) Assignee: Servicesource International, Inc., San Francisco, CA (US)

( * ) Notice: Subject to any disclaimer, the term of this patent is extended or adjusted under 35 U.S.C. 154(b) by 1609 days.

This patent is subject to a terminal disclaimer.

(21) Appl. No.: 12/365,124

(22) Filed: Feb. 3, 2009

(51) Int. Cl.
*H04L 29/06* (2006.01)

(52) U.S. Cl.
USPC ...... 726/6; 726/17; 726/18; 726/19; 713/173; 713/186

(58) Field of Classification Search
USPC ............................................. 726/6
See application file for complete search history.

(56) References Cited

U.S. PATENT DOCUMENTS

| | | | | |
|---|---|---|---|---|
| 4,805,222 | A | * | 2/1989 | Young et al. ............... 382/115 |
| 5,557,686 | A | * | 9/1996 | Brown et al. ................ 382/115 |
| 6,151,593 | A | * | 11/2000 | Cho et al. ...................... 706/16 |
| 6,311,272 | B1 | | 10/2001 | Gressel |
| 6,938,159 | B1 | * | 8/2005 | O'Connor et al. ........... 713/186 |
| 7,260,837 | B2 | * | 8/2007 | Abraham et al. ................ 726/4 |
| 7,506,174 | B2 | * | 3/2009 | Davis et al. .................. 713/186 |
| 7,509,686 | B2 | * | 3/2009 | Checco .......................... 726/27 |
| 7,543,155 | B1 | * | 6/2009 | Kobylak et al. .............. 713/184 |
| 7,797,549 | B2 | | 9/2010 | Main et al. |
| 2004/0015714 | A1 | * | 1/2004 | Abraham et al. ............. 713/200 |
| 2004/0059950 | A1 | * | 3/2004 | Bender et al. ................ 713/202 |
| 2006/0242424 | A1 | * | 10/2006 | Kitchens et al. ............. 713/183 |
| 2007/0236330 | A1 | * | 10/2007 | Cho et al. ..................... 340/5.54 |
| 2008/0028231 | A1 | * | 1/2008 | Bender ........................ 713/186 |
| 2008/0037832 | A1 | | 2/2008 | Phoha |
| 2009/0150992 | A1 | | 6/2009 | Kellas-Dicks et al. |
| 2009/0240949 | A9 | * | 9/2009 | Kitchens et al. ............. 713/183 |

OTHER PUBLICATIONS

Lee, J. W., et al., "An evolutionary keystroke authentication based on ellipsoidal hypothesis space", *GECCO '07: Proceedings of the 9th annual conference on genetic and evolutionary computation*, New York, NY, USA, (2007), 2090-2097.

Scout Analytics, Inc., Non final office action mailed Jun. 21, 2011 for U.S. Appl. No. 12/365,103.

Teh, P. S., et al., "Statistical fusion approach on keystroke dynamics", *Third International IEEE Conference on Signal-Image Technologies and Internet-Based System (SITIS '07)*, IEEE Computer Society, Washington, DC, USA, (2007), 918-923.

* cited by examiner

*Primary Examiner* — Yonas Bayou

(74) *Attorney, Agent, or Firm* — Blakely Sokoloff Taylor & Zafman LLP

(57) ABSTRACT

Embodiments of the invention relate to collecting keystroke timing data of samples of a phrase input by a user on an input device during different user sessions, and creating a biometric user template based on the timing data collected during the different sessions. Once a sufficient number of samples are collected, the template may be used to authenticate the user.

28 Claims, 5 Drawing Sheets

GRADUAL TEMPLATE GENERATION

FIELD

Keystroke dynamics authentication related to keystroke biometric timing data of a user.

BACKGROUND

Computer systems often contain valuable and/or sensitive information, control access to such information, or play an integral role in securing physical locations and assets. The security of information, assets and locations is only as good as the weakest link in the security chain, so it is important that computers reliably be able to distinguish authorized personnel from impostors. In the past, computer security has largely depended on secret passwords. Unfortunately, users often choose passwords that are easy to guess or that are simple enough to determine via exhaustive search or other means. When passwords of greater complexity are assigned, users may find them hard to remember, so may write them down, thus creating a new, different security vulnerability.

In some cases, computer systems use authentication systems to protect resources, such as documents and data, and accurately identify the creator of the resource. For example, a message (i.e., a written instrument or electronic document) created by an individual can be marked by a digital version of a hand written signature, or protected by a password or a personal identification number (PIN) in order to identify the author of the message or control access to its contents. In some electronic computing devices or computer systems, the signature, PIN or password of the person authorized to access the resource (or a message creator) is stored in a central memory or in storage media that is part of the computer system. When a user desires to read the protected message, the user enters the appropriate signature, password or PIN using an input device (e.g., a keyboard, touchpad or the like). The computer system compares the signature, password or PIN that is entered using the input device with the stored signature, password or PIN associated with the message to be accessed and determines whether to allow the message to be displayed or accessed.

Various approaches have been tried to improve the security of computer systems including authentication systems that rely on unique physical characteristics of users to identify authorized users. For example, fingerprints, voice patterns and retinal images have all been used with some success. However, these systems usually require special and/or additional hardware to implement (e.g. fingerprint or retinal cameras; audio input facilities). Moreover, these systems may require an undesirable amount of time to setup or to generate an original pattern for use when authenticating the user. Therefore, there is a need for an authentication process that uses unique physical characteristics of users, without requiring additional or special hardware, and without requiring additional time.

SUMMARY OF THE DESCRIPTION

Embodiments of the invention describe gradual generation of a biometric authentication system template by collecting keystroke timing data of samples of a phrase or password input by a user on an input device during a number of user sessions, and then creating a biometric user template based on the timing data collected. Different user sessions may occur in different settings, at different computer systems, or using different input devices to allow for more practical data to be incorporated into the template. During the first sessions, the template is not yet complete, so the user is authenticated for each session using a non-biometric authentication. During the non-biometric authentication, timing data from keystroke events of the user's entry of the password are gathered and stored as incomplete template data. At first, the template is incomplete, but once timing data for enough samples is gathered to identify the user's typing, the template is completed using data from a current sample combined with stored incomplete template data. The user may then be bio-authenticated by comparing timing data of subsequent entry of the password with the template.

BRIEF DESCRIPTION OF THE DRAWINGS

The present invention is illustrated by way of example and not limitation in the figures of the accompanying drawings in which like references indicate similar elements. It should be noted that references to "an" or "one" embodiment in this disclosure are not necessarily to the same embodiment, and such references mean "at least one."

DETAILED DESCRIPTION

Figure 1:
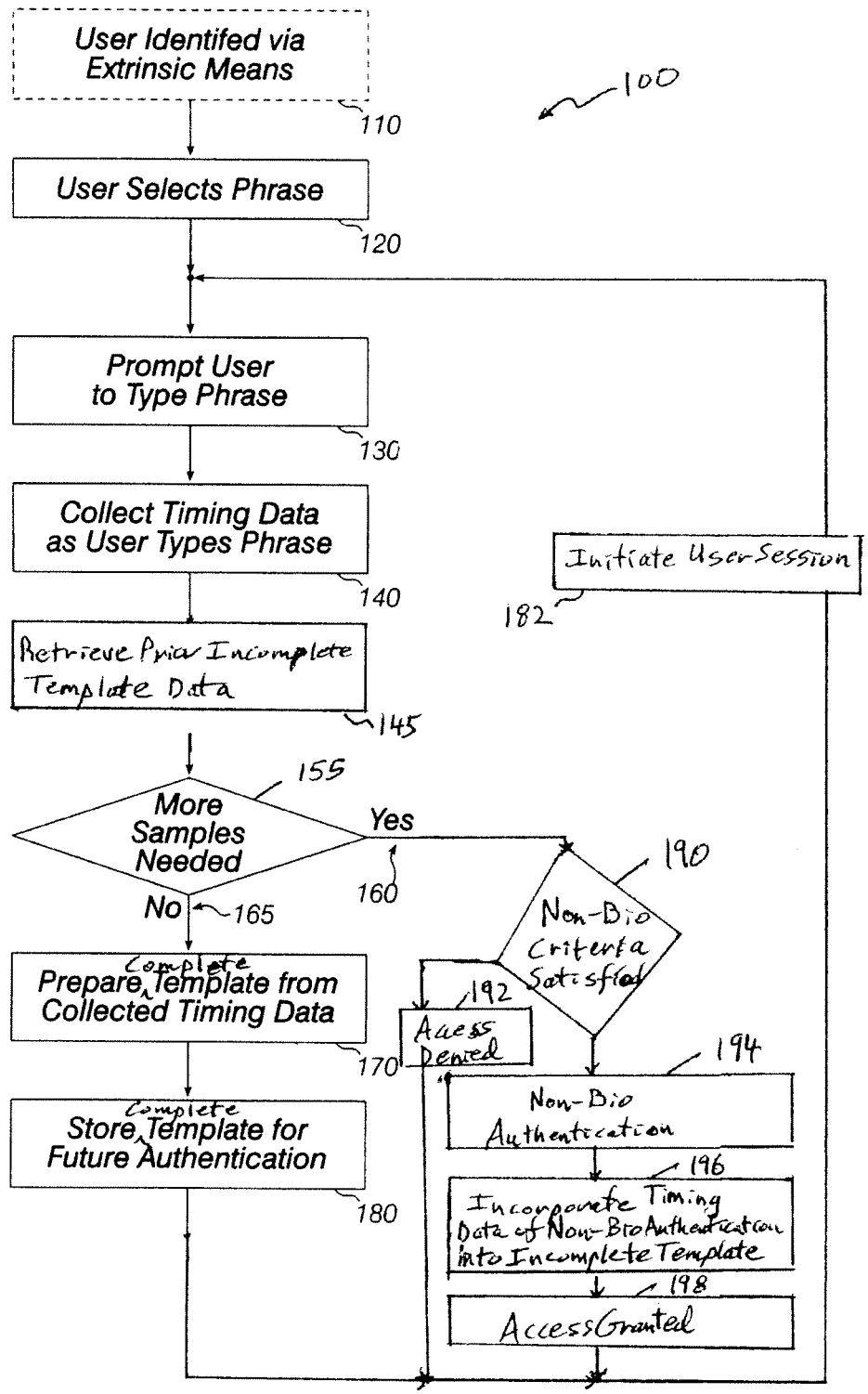
FIG. 1 is a flow chart outlining the gradual construction of a keystroke dynamics user authentication template according to an embodiment of the invention.

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims. It will be apparent to one of ordinary skill in the art that the embodiments may be practiced without some of these specific details. In other instances, certain structures and devices are omitted or simplified to avoid obscuring the details of the various embodiments.

Collection and Use of Biometric Data

Biometric authentication may authorize users to access a resource such as a document or device based on the user's input patterns or input keystroke timing data when entering a phrase. A biometric authentication system can protect a resource such as a computer system, operating system, data, or software application from being accessed, modified, or executed by individuals who do not have authorization for such access.

A biometric template (e.g., a user pattern) may serve as the foundation for bio-authenticating a user. The biometric template is prepared after or upon completing an enrollment process that collects biometric data (e.g., input time stamps or points) from the user's input based on key-press and key release event data of a phrase entered by the user on a keyboard. For example, a user may type in and a computer system may receive (e.g., collect) numerous samples (e.g., attempts to type all the characters of the phrase) of a phrase such as a user ID and/or a pass phrase (e.g., a "password") on a keyboard as part of an enrollment process. A biometric template is then created having vectors for various features of the phrase statistically calculated based on the collected keystroke timing data of the samples. The template may be used to identify the user's biometric measurements or typing style for the typed phrase. The template may represent or identify the user's typing rhythm based on timing data measuring features for some or all of the samples of the phrase. In some embodiments, the template and biometric authentication data may be described as "biologically" dependent or based, such as by being unique to the biological characteristics of a subset of one person (or a small number of people) of the set of all living people.

After the template is formed, as part of an authentication process, a computer system collects additional keystroke timing data and compares the additional information with the template. For example, a user may type in and a computer system may receive (e.g., collect) one or more authentication samples of the phrase on a keyboard as part of an authentication process. Data including timing data based on the user's typing rhythm during authentication may then be extracted. The authentication input timing data of each feature of the phrase based on the authentication input data is compared against the feature vectors of a template corresponding to the user. If the data related to the user's typing rhythm is found to be a suitably similar to the data found in the template, the user may then be successfully bio-authenticated.

However, the process of comparing a biometric sample to a template or reference sample to determine whether the samples describe the same person is a difficult one. Some technologies incorporate improved algorithms to validate biometric samples to reduce false acceptance rates ("FAR") and false reject rates ("FRR").

In addition, gradual enrollment or template generation may also reduce FRR without requiring improved algorithms. For example, there are instances when the user may be falsely rejected because of an unreliable template or extraneous conditions (e.g., based on the user's setting) that impact the input data. Extraneous conditions that could derail a positive authentication of the user may include situations where the user is experiencing a high level of stress. A user under an abnormal degree of stress could exhibit physiological changes that would modify the user's typical rhythm under normal circumstances. Further, differences in input devices (e.g., keyboard devices) may introduce timing differences or delays that contribute to an authentication error. Therefore, a process is needed to account for such occurrences of falsely rejecting the user so that biometric authentication based on the template is improved.

Gradual Generation of a Biometric Template

In a 'generic' template generation technique, using a single user session to collect repetitive "enrollment" samples (e.g., samples collected prior to generation of a complete template) is a proved methodology, such as, in case of behavioral biometrics, to provide measurements that are more repeatable and allow use of a template during the single user session. However, due to the limited nature (single location, computer system, input device, neurological state, physical state and behavioral state of the user) of the single session FRR may be incurred when the session characteristics are varied, such as when the user attempts to bio-authenticate by entering an "authentication" sample during a different session. Consequently, collecting enrollment samples gradually, over different user sessions allows the template to be based on (e.g., to be created or calculated using) various locations, computer systems, input devices, neurological states, physical states and behavioral states of the user, thus reducing FRR. Hence using gradual enrollment or template generation (e.g., input of samples during numerous different user sessions until a template creation criteria is met) is a logical methodology.

For example, variations in input timing data may occur when a user enters multiple samples. The timing when the user enters a first password may differ from the timing when the user enters a second password. Therefore, to reduce FRR it may be important to consider these variations of samples to produce a category of samples which best represents the physical and/or behavioral characteristics of the user in settings where the user may desire access to a resource, such as by using gradual template generation. In this way, multiple categories (e.g., features) that best represents the physical/behavior characteristics may be used to create a biometric template for future authentication purpose, thus reducing FRR.

According to embodiments of gradual enrollment, a template may include collected enrollment keystroke timing data from more than one user session and/or setting. It is possible to create a template during a single user session (or setting) and then modify the template using data from one or more additional user sessions (or settings). However, according to embodiments, the template may be created gradually using data from more than one user session (or setting). In one embodiment, the enrollment process may be implemented as a gradual process in a sense that the user's enrollment input data is cumulatively collected and stored (e.g., in as incomplete template data, as part of a bio-authentication system or software application, such as in a database, as a file or otherwise), while the user is authenticated to access resources using non-bio-authentication, until a satisfactory amount of collected samples is met to produce a completed template for the user (e.g., completed based on or using the previously stored user's enrollment input data).

Figure 2:
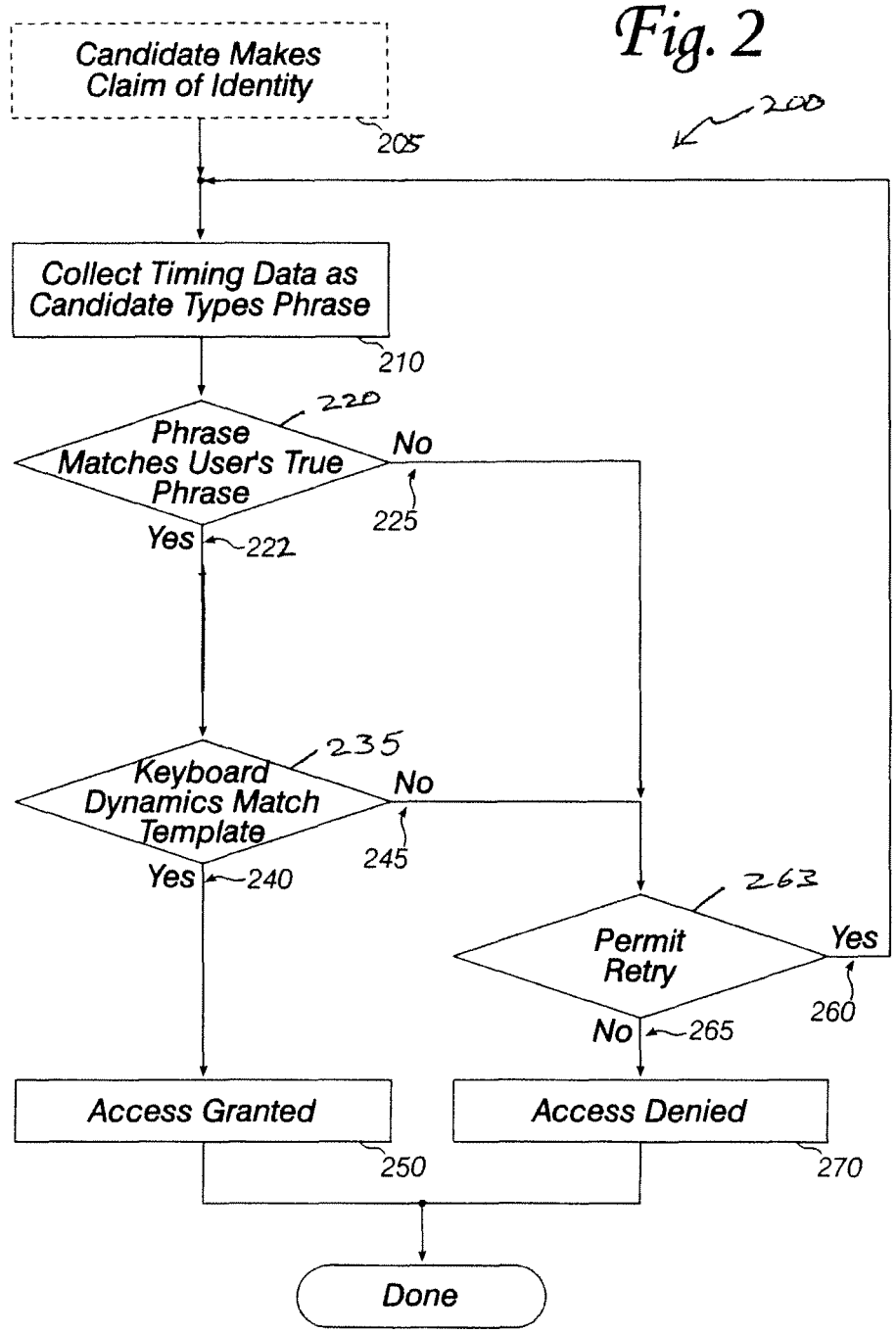
FIG. 2 is a flow chart outlining the use of a template constructed according to an embodiment of the invention.

FIGS. 1 and 2 are flow charts outlining the two principal sets of operations in an embodiment of the invention: enrollment (i.e., preparing a biometric template), and authentication (i.e., using a biometric template).

Generation of a Biometric Template

FIG. 1 is a flow chart outlining the gradual construction of a keystroke dynamics user authentication template according to an embodiment of the invention (e.g., enrollment process 100). During enrollment, a user may optionally be identified by extrinsic means (110). For example, a security officer may check the user's photo identification, fingerprints, or other identifying characteristics. In some embodiments, extrinsic identification is not necessary: the system is only being used to ensure that the person who enrolled at a first time is the same as the person who wishes to use the computer system (or other protected resource) at a later time.

After (optional) extrinsic identification, the user selects a phrase (120), such as a phrase of characters making up a password or other phrase. In many embodiments, the phrase is the user's (secret) password, but it is not necessary that the phrase be secret, or even that it be unique to the user. For instance, once a user template is created, it may not be necessary for the phrase be secret, or unique to the user. Instead, the phrase may be known to others and/or may be the same phrase used to form a biometric template for others. In some systems, a user may use two or more phrases during enrollment and verification. For example, the first phrase may be the user's login name or email address, and the second phrase may be his password. The phrase may also be a user name and/or password.

An embodiment prompts the user to type the phrase (130), and collects (e.g., receives) timing data (e.g., timing data) as the user types the phrase (140) (e.g., to enter an enrollment sample of the phrase, which may be used to also non-bio authenticate the user). A sample may be a single attempt to type all the characters of the phrase (e.g., to type all the characters once, without a backspace or delete key entry). According to embodiments of the invention, a computer system receives (e.g., collects) keystroke timing data as a user types on an input device. For example, the user's input pattern may include timing data of key-press and key-release events detected during entry of a phrase of subsequent characters. The input device may include a keyboard, buttons, touch pad, touch screen, a button (e.g., directional mouse button), a number pad, mobile device, or PDA to input the phrase.

The user identifies or signals the end of the phrase or sample by typing a key like "Enter," "Return," "Send" or "Tab," or by pressing a button of a mouse or other user interface device. If prior "incomplete" template data exists (e.g., from a prior user session), that data may be retrieved and combined with the current timing data (145). For instance, there may or may not exist (e.g., stored in a memory or database of a computing device) prior incomplete template data previously entered by the user from a prior user session (e.g., timing data from samples previously entered, such as by a non-bio authenticated user). If such data exists, it may be retrieved and/or combined (e.g., by a system or software application) with the data collected at block 140 (e.g., without creating a template until block 170). Based on the collected samples (e.g., based on data from the combination of the sample collected at block 140 and any prior samples retrieved at block 145), if at block 155 an adequate number of samples have been collected (165), then a completed template is prepared from the collected timing data (170) and stored for use in subsequent authentication operations (180).

In some embodiments, an adequate number of samples may be at least 5, 6, 8, or 10 samples; or may be in a range between any two of 6, 8, 10, 15, 20 or 25 samples. In some cases, an adequate number of samples may be described by at least 5, 6, 8, or 10 samples having feature data points within a predetermined threshold minimal distance of each other (e.g., in the vector sense, such as according to statistical calculations and/or Euclidean distance). The minimal distance may be described by the data points of a predetermined number of samples (e.g., an adequate number as described above) being within a single band or a single standard deviation.

In some embodiments, an adequate number of samples may exist after: (1) at least a predetermined minimum number of enrollment samples have been input; (2) feature data points for at least another predetermined minimum number of enrollment samples are within a predetermined threshold minimal distance of each other; and/or (3) a template calculated for the enrollment samples satisfying (2) has a template quality (TQ) greater than a predetermined TQ minimum. "Bins" of "like" samples classified together may be used to determine if enrollment samples are within a predetermined threshold minimal distance of each other. The bins may combine samples that are relatively "close" to each other to remove data point outliers prior to template creation. The "closeness" may just be a distance equation, such as based on or calculated using the Euclidean distance of sample data points. As noted, variations may occur when a user enters multiple samples. For example, the timing when the user enters a first password may differ from the timing when the user enters a second password. Therefore, it may be important to categorize these variations of samples and eliminate outliers. In eliminating outliers, a category of samples which best represents the physical and behavioral characteristics of the user may be found.

In at least one case, an adequate number of samples may exist after: (1) there is a minimum of at least 5 samples input; (2) at least one bin contains at least 5 samples; and (3) after the template is created, the TQ of the template is above a TQ threshold. The samples that satisfy the requirements noted above may be described as having sufficient feature data to compare to input data features to provide bio-authentication of the user.

The biometric template is then created based on the collected keystroke timing data. The template may be used to identify the user's biometric measurements or typing style for a typed phrase. The template may represent or identify the user's typing rhythm based on timing data measuring features, such as key dwell times and key flight times for some or all of the samples of the phrase. Key dwell time is the amount of time that the user holds down a particular key before releasing the key (e.g., a measurement of time from key down to key up of the same key). Key flight time is the time between releasing a key before pressing down on the same or another key (e.g., a measurement of time from key up of one key to key down of a subsequently pressed key). Additional features that may be considered for template generation and authentication are explained further below (e.g., See FIGS. 3 and 4). For example, it may also be possible to measure (and use as a feature) the time between pressing down a key before releasing down on the same or another key (e.g., a measurement of time from key down to key up of a subsequently pressed key).

In one embodiment, the template is a structured set of numbers which describes the user's typing rhythm or typing style. In one embodiment, a template comprises a center vector and a variability vector for at least one feature, where the vectors are calculated based on timing data for each of a number of characters (e.g., upper and/or lower case letters, numbers, spaces, and/or symbols; but not deletes or backspaces) of a phrase. The center vector may include values that describe the user's typical values related to typing rhythm. A variability vector may include values that describe the pointwise consistency of the user's input timings for indicating the degree in which the input samples from the "raw" timing data values can be varied. Multiple bands within a variability vector may be used to describe multiple ranges (e.g., concentrically expanding in magnitude) of consistency of the user's input timings. Calculation of the vectors and bands may include averaging sample data (e.g., the user's input timings) and/or other statistical calculations.

In some cases, each feature (e.g., "measuring feature" of the template to be compared to authentication input data) may have a center vector and an associated variability vector (e.g., they are paired together). There may be a center/variability pair of vectors for each feature (e.g. there may be a center vector and variability vector for key dwell times and another center vector and variability vector for key flight times of the phrase). The size or dimension of the vector may depend on the "measuring feature" it is associated with. For example, the dwell center and variability vectors have a size that is equal to the number of characters in the phrase. For flight the size is one minus the number of characters in the phrase.

In one embodiment, the center vector is the average of the input sample vectors from previous user input data and the variability vector is based on concentrically expanding multiples of the statistical standard deviation based on input sample vectors from previous user input timing data. Variability vectors can be proportional to statistical standard deviations based on user input data for features of a phrase. In other cases, variability vectors can be based on the root mean square of the differences between the average and the input sample vectors from previous user input data. In some embodiments, a center vector equals or is based on a weighted mean calculated from the timing data; and an associated variability vector equals or is based on a weighted standard deviation calculated from the same timing data. For instance, the center vector and variability vector may each be weighted to more heavily consider more recent samples as compared to older samples (e.g., increase the effect of data of a more recent sample in calculations), such as to reduce FRR and/or FAR, as will be explained further below.

In block 145, a distribution of the timing data of key-press and key-release events to a corresponding range of values from the keystroke dynamics template is calculated and may be included in the template data (included in incomplete template data at this point, until block 170 where the template is created). For instance, at block 145, the incomplete template data may be a combination (e.g., a statistically calculated distribution) based on prior incomplete template data (e.g., if such data exists, such as by being incorporated or stored at block 196 after entry at block 140 of a prior user session) and current timing data (collected at block 140 of a current user session).

If more samples are needed (160), the collection and computation process determines whether a non-bio authentication criteria is satisfied (190). If a non-bio authentication criteria is not satisfied, access to the resource is not provided (192). If a non-bio authentication criteria is satisfied, the non-bio authentication is considered a success (194), non-completed (incomplete) template data is incorporated (e.g., including or prepared from the collected timing data) (196), and access to the resource is provided (access granted) (198). Block 196, may include storing (e.g., incorporating) the incomplete template data. Block 196 may optionally include combining the prior incomplete template data with the current sample (e.g., if such combination is not provided at block 145).

In some cases, at block 190, an input phrase (e.g., password) is compared lexically with the phrase (password) of the legitimate user, and if they match processing goes to block 194, 196 and 198 where the user is provided access to the system or other resource. If at block 190, they do not match, processing goes to block 192 and the user is not provided access (access denied) to the system or other resource.

Non-bio authentication criteria at block 190 may also be based on a one time password; a knowledge based password or authentication; and/or a non-bio authentication processes or systems as known in the art. According to some embodiments, gradual template generation excludes data gathered during unsuccessful bio-authentication. For example, gradual template generation is completed prior to or upon generation of a completed template.

In some cases, a non-bio authentication process or system may include a one-time password (e.g., a mechanism or process) for authentication which relies upon a constantly varying passkey which, once used, is "expired" and cannot be re-used for authentication. Also, a one-time passkey may expire after a certain amount of time, e.g. a few minutes, regardless of whether or not the passkey is used. The passkey (or password) may be generated as follows. A mathematical process or algorithm is initialized with a secret (e.g., to the general public, or user) seed value. When a new passkey is needed, a second input (e.g. the previous passkey or the current time) is passed into the secret mathematical process or algorithm and combined with the secret seed to generate a new passkey.

The mode of communicating the passkey to the legitimate user (e.g., sending so that the user can receive the passkey) can be through the distribution of a physical device (e.g., a token, such as a computer device containing the secret mathematical algorithm, the secret seed, and synchronized with the current time) that can generate the passkey. Another way of communicating the passkey is to download (e.g., by the user) software containing the secret mathematical algorithm and the secret seed to a wireless or wired communication and/or computer device (e.g., the user's cell phone), thus enabling the device (cell phone) to generate the passkey. Another way is to send the passkey directly to a wireless or wired physical device known to be in the possession of the user (e.g. sending a text message to a user's cell phone).

In some cases, a non-bio authentication process or system may include a knowledge-based authentication, which is a mechanism (e.g., implemented using a wireless or wired communication and/or computer device) for authenticating based upon personal knowledge of a user. Typically this type of authentication is performed as follows. During enrollment (e.g., part of process 100 not shown, or at block 110) a user is asked to select a number of questions from a pre-defined list and provide an answer (usually personal in nature and not known or easily discoverable by people who are not familiar with the user) to each. During authentication, the user is provided with some subset of these questions of which the user must answer a certain number of correctly. Typically the answers are provided and supplied in a textual fashion, such as using a wireless or wired communication and/or computer device.

Thus, FIG. 1 may describe one embodiment of gradual template generation process 100 for incorporating data related to collected timing data of key-press and key release events into a biometric template. More specifically, in some embodiments, blocks 140, 155, 190, 194 and 196 may describe gradual enrollment or gradual template generation. Completion of template generation (block 170) may optionally be included.

For instance, block 140 may describe collecting keystroke timing data of a plurality of samples of a phrase input by a user on an input device during more than one user session. Then, after or during gradual enrollment, block 170 may describe calculating or creating a biometric user template based on the timing data collected during the user sessions. Also, block 196 may describe authenticating the user for each session using a non-biometric authentication, wherein the timing data includes a phrase input by the user during the non-biometric authentication. Gradual template generation process 100 and block 196 may exclude authenticating the user using a biometric authentication for each user session from which the template uses or includes timing data.

For instance block 196 may describe calculating, storing, and/or creating an incomplete biometric user template. An incomplete user template may require additional samples at block 155 to provide identification of the user; and/or may have insufficient feature data to compare to input data features to provide bio-authentication of the user. At this block, the collected timing data of key-press and key-release events may be incorporated into (e.g., modified with, using or based on) the incomplete keystroke dynamics template data in response to or after denying preparation of a complete template (160) and successful non-bio user authentication (194). For example, the combined current timing data and prior timing data from block 145 of the current session may be stored (e.g., stored in a memory or database of a computing device) to be used as prior incomplete template data during a subsequent user session (at block 145 of the next session). After block 180, 192 or 198, processing continues to block 182 where another different user session (e.g., a second session) is initiated.

A user session may be defined or distinguished by authenticating a user within a period of time; using a single computer system; using one or two input devices; and/or a user in only a single setting. In some cases, a user a session may be defined by authenticating a user within less than a threshold value of 1, 2, 3, 5, or 10 minutes. It is also considered that a session may be completed prior to or by a subsequent power off, power down, sleep mode, reboot, power-on, reset, or entering low power mode of a computer system (182). Similar events such as log out, log off, login, logon of an application or operating system may also describe the end of one session and/or the beginning of a different session (182).

During a second session, block 130 may describe collecting subsequent keystroke timing data of at least one sample of the phrase input by the user on the same or a different input device during a second different user session. Then, if more samples are not needed (165), block 170 may describe incorporating (e.g., modifying) the incomplete template data with (e.g., based on or using) the subsequent keystroke timing data to create a complete template for which additional samples are not needed (165). A complete template may not require additional samples to provide identification of the user; and/or may include sufficient feature data to compare to input data scores to provide bio-authentication of the user (165).

For a completed template, in some embodiments, the center vector and variability vector of template creation data (e.g., including what was previously incomplete template data) may each be weighted to more heavily consider more recent samples as compared to older samples (e.g., increase the effect of data of a more recent sample in calculations), such as to reduce FRR and/or FAR. It can be appreciated that this weighting provides a more accurate template for reducing FRR and/or FAR by more heavily weighting or considering the more recent user sessions.

For instance, during creation of a completed template, a center vector may equal or be based on a weighted mean calculated from the timing data; and an associated variability vector may equal or be based on a weighted standard deviation calculated from the same timing data by more heavily weighting or consider more recent samples as compared to older samples of only enrollment samples, of only authentication sample, or of both enrollment and authentication samples.

Specifically, in embodiments a weighting mechanism (e.g., algorithm used by a computer device to create a template used for bio-authentication) is constructed as follows. Each sample (call it '$S_i$') (e.g., an enrollment sample) that is submitted (e.g., collected for use by the template update algorithm) is assigned a weight that reflects the time (e.g., current date and time) it was submitted (call it '$W_i$'). To favor more recent samples, $W_2 > W_1$ if $S_1$ is submitted prior to $S_2$.

The template is then created using a weighted average/mean for the center (call it 'C') and weighted standard deviation for the variability (call it 'V'). Since $S_i$, C and V are all vectors the equations are written point-wise, where:

$S_{i,j}$ is the $j^{th}$ point in the $i^{th}$ Sample vector
$W_i$ is the weight associated with the $i^{th}$ Sample
G is the $j^{th}$ point of the Template Center vector
$V_j$ is the $j^{th}$ point of the Template Variability vector $$C_j = \frac{\sum_i \{S_{i,j} * W_i\}}{\sum_i W_i}$$

And $$V_j = \sqrt{\frac{\sum_i \{W_i * (S_{i,j} - C_j)^2\} * \sum_i W_i}{\left\{\sum_i W_i\right\}^2 - \sum_i \{W_i\}^2}}$$

In some cases, the weighting process is exactly the same for enrollment samples (e.g., for creating the completed template) as it is for authentication samples (e.g., for updating or modifying a created template. but for the type of input. For template creation the input samples may be enrollment samples only. For template update the input samples may include enrollment samples and authentication samples (either biometrically failed or validated) that are part of a successful login attempt (either biometric or non-biometric). Since a user's typing rhythm is an evolving one, weighting the most recently submitted samples more than the older samples allows the template to be more adaptive to that evolving rhythm (e.g., to reduce FRR and/or FAR).

Authentication Based on Collected Biometric Data

FIG. 2 is a flow chart outlining the use of a template constructed according to an embodiment of the invention. FIG. 2 outlines one such subsequent authentication operation (200). During bio-authentication, a prospective user ("candidate") may claim to be a legitimate user of the system (205). The system collects timing data as the candidate types a phrase (210). The phrase is compared lexically with the phrase of the legitimate user (220), and if they match (222), the collected timing data is compared with the corresponding template that was created during enrollment (235), and if there is again a match (240), the candidate is granted access to the system or other resource (250).

If the phrase typed by the candidate does not match the legitimate user's phrase (225), or if the keystroke dynamics differ (245), at block 263, the system may permit the candidate to try typing the phrase again (260). If the permissible number of retries is exhausted (265), the candidate is denied access to the system or resource (270).

For example, a user may type in and a computer system may receive (e.g., collect) one or more samples of the phrase on a keyboard (210) as part of an authentication process (200). Data including timing data based on the user's typing rhythm during authentication may then be extracted and compared against the template corresponding to the user (235). The user's typing rhythm may be based on timing data measuring key dwell times and key flight times. If the data related to the user's typing rhythm is found to be a suitably similar (e.g., a match) to the data found in the template, the user may then be successfully bio-authenticated (240 and/or 250).

For instance, in block 235, a keystroke dynamics template ("template") from data including previously measured key-press and key-release times for samples may be compared to the phrase timing data of the currently input user sample. The previously measured key-press and key-release times were collected during the enrollment process to construct the template. Specifically, data points for features of the phrase input by the supposed user, calculated based on the current sample timing data, may be compared to feature vectors and/or bands of the user's template. The data points can be given a "data point score" based on how proximate (e.g., using Euclidean distance) they are to the center vector (e.g., based on the data points location in the variability vectors or bands), such as by comparing the proximity of the data points to an upper and lower value of the band created by shifting the center vector positively and negatively by a multiple of the variability vector of corresponding features of the user's template. The comparison may include processing the template with the current user input data to calculate a probability success value (e.g., data point score) related to features for each data point of the user input data as compared to vectors of features of the template, and then using all the data point scores to generate a total "score" for the attempted bio-authentication input sample.

In some cases, an authentication sample "score" is generated by comparing the authentication input timing data of each feature of the phrase against the feature vectors of a template corresponding to the user. If the data related to the user's typing rhythm is found to be a suitably to the data found in the template, the user may then be successfully bio-authenticated. Suitably similarity (e.g., "matching") may be when a predetermined number of the authentication input timing data are within a number predetermined ranges or bands of (e.g., statistical, probability and/or percentage distances in the vector sense, such as calculated using Euclidean distance) of the feature vectors of the template. A match may occur when the authentication score is within a predetermined threshold value or acceptance score.

Specifically, the data in the template may be divided into sets of bands, wherein each band includes a respective range of values related to the data in the template. Each band may also overlap with other band for a single feature or data point. For example, the data in the template may range from the value of the template center minus a constant "m" (e.g., 3) times the template variability to the value of the template center plus m times the template variability. This range may then be divided into k number of bands (represented by different multiples of the template variability, each multiple being between 0 and m) that may represent the entire range of acceptable values. For each band within the template data range (e.g., a band in which a data point is acceptable), the input authentication sample data will be evaluated to be either within the band or outside of the band. A score may be calculated based upon the number of sample data points that fall within each template band in correlation to the relative "tightness" of the band. The tightness of a band may be based on how many (e.g., in number) variability vector distances away the data point is from the center vector. A band defined by 1 times the template variability vector in distance will influence the score more (e.g., add more to the total score) than a band defined by 2 times the template variability vector in distance. If the total score (e.g., based on or using the data point scores) is above a given threshold then the user is considered authentic (e.g., it is a match) and allowed access to requested resource(s).

In some case, a statistical system may create an n-dimensional vector containing average key dwell values computed when or while a user enrolls, and include this vector in the template (e.g., creates complete or incomplete template). (n is an integer equal to the number of character-generating keystrokes in the phrase: for a seven-character phrase, there will be seven key dwell values.) During authentication, a similar n-dimensional vector of key dwell values (e.g., data points), computed based on a candidate's single entry of the phrase, may be examined to find its Euclidean distance from the corresponding vector in the template. The probability that the candidate is the same as the enrolling user is inversely proportional to the Euclidean distance. (It is probably more accurate to say that the probability is strongly negatively correlated with the distance.)

In some embodiments, a candidate need not make any assertion as to his identity. He may simply type a phrase, which the system compares to all enrolled users' phrases and keystroke dynamics templates. If the candidate's typed phrase matches one of these, he is granted access according to the matching template.

During enrollment, the user may be in a controlled environment that promotes the user to provide consistent user input samples. The controlled environment may include the same type of computer system with the same type of keyboard device. However, the user may be falsely rejected based on user input samples of key timing data because of changes to this controlled environment or input device during authentication. For example, the user may be at a remote location using a separate computer system than the one that was used during enrollment. This separate computer system may include a different type of keyboard device (e.g., wireless, BLUETOOTH, laptop, laptop in a docking station, or desktop) and may be located in the remote location away from the computer system containing the resource to be accessed. In other instances, the user may be using the identical computer system used during enrollment, but other factors contribute to the user being falsely rejected. These other factors include physiological changes (e.g., the user's nervous system may be impaired in some fashion or in an abnormal state) that introduce variations into the keystroke timing data collected from the user input.

Thus, gradual enrollment or template generation may account for or provide fewer FRR for users desiring authentication from different user sessions or user settings, including different extraneous conditions, levels of stress, input devices (e.g., keyboard devices), by allowing for a template created based on various locations, computer systems, input devices, neurological states, physical states and behavioral states of the user.

In addition, this authentication process may not require complicated or additional physical characteristic recognition systems; may provide a cost effective and secure authentication process, and may provide an authentication process that does not entirely rely on the content or security of a password or of secured information. For example, gradual template generation may occur without taking undue amounts of a user's time (e.g., without requiring, during a single user session, an authentication that takes more than 5 or 10 successful input samples).

Figure 3:
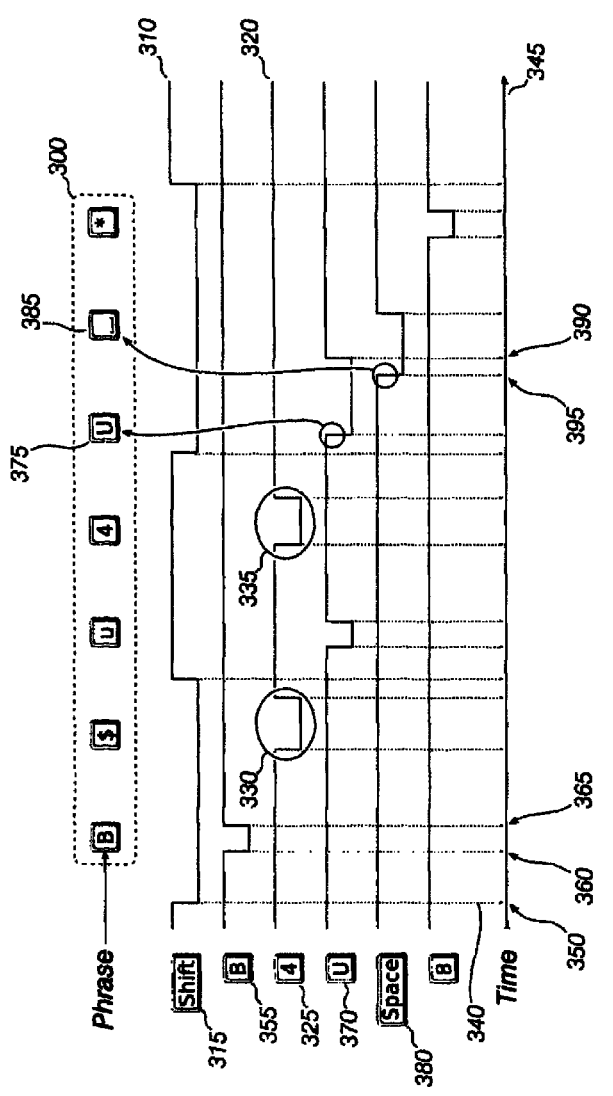
FIG. 3 illustrates keyboard events that occur during the typing of a phrase.

FIG. 3 is a graphical depiction of a phrase 300 and the corresponding keyboard activity that may occur during typing of the phrase. Horizontal traces (e.g., 310, 320) indicate whether the corresponding keyboard keys (e.g., 315 and 325, respectively) are pressed. For example, the portion of trace 320 circled at 330 indicates a first press-and-release cycle of the '4' key 325, while the portion of trace 320 circled at 335 indicates the second press-and-release cycle of the same key.

Vertical dashed lines 340 indicate when a key press or key release event occurs by pointing to a spot along "Time" axis 345. For example, the first depression of the "Shift" key 315 occurs at time 350. Subsequently, the 'B' key 355 is depressed at time 360 and then released at time 365. Characters of the phrase 300 are produced in the order that character-generating keys are depressed. Two or more keys may be depressed simultaneously (for example, both "Shift" key 315 and '4' key 325 are depressed during the interval circled at 330.

Character-generating keys are those that produce a character when they are depressed. Of the keys shown in this Figure, all except "Shift" key 315 are character-generating. The "Shift" key 315 is a modifier that may change the character produced when a character-generating key is depressed.

Sometimes a key release corresponding to a first key press may occur after the subsequent key press. This situation is depicted in FIG. 3: the second depression of 'U' key 370, which produces the upper-case 'U' 375 in phrase 300, continues until time 390, after the depression of "Space" key 380 at time 395 which produces the corresponding space character 385 in phrase 300.

An embodiment of the invention collects information about the depression and release of keys typed by a user during enrollment or during authentication. This information typically comprises the items listed in Table 1:

TABLE 1

| Key | Action | Timestamp |
| --- | --- | --- |
| Shift | ★ | 2007-Nov-19 14:28:34.000383 |
| B | ★ | 2007-Nov-19 14:28:34.752886 |
| B | * | 2007-Nov-19 14:28:34.813777 |
| 4 | ★ | 2007-Nov-19 14:28:35.016915 |
| 4 | * | 2007-Nov-19 14:28:35.104793 |
| Shift | * | 2007-Nov-19 14:28:35.164335 |
| U | ★ | 2007-Nov-19 14:28:35.609386 |
| U | * | 2007-Nov-19 14:28:35.744492 |
| 4 | ★ | 2007-Nov-19 14:28:36.027649 |
| 4 | * | 2007-Nov-19 14:28:36.137421 |
| Shift | ★ | 2007-Nov-19 14:28:36.460362 |
| U | ★ | 2007-Nov-19 14:28:36.628027 |
| Space | ★ | 2007-Nov-19 14:28:36.707690 |
| U | * | 2007-Nov-19 14:28:37.143059 |
| Space | * | 2007-Nov-19 14:28:37.209763 |
| 8 | ★ | 2007-Nov-19 14:28:37.596926 |
| 8 | * | 2007-Nov-19 14:28:37.640540 |
| Shift | * | 2007-Nov-19 14:28:37.764426 |

An embodiment of the invention collects information about the depression and release of keys. In other words, each time a key is pressed or released, a record is produced identifying the key, the action and the time at which the action occurred. This is the only "real" or physical data collected in many embodiments. Special keyboards that can sense typing pressure, finger temperature, or the like, may produce more real data, but such keyboards are uncommon, and an embodiment gives up broader applicability if it relies on such enhanced data.

Figure 4:
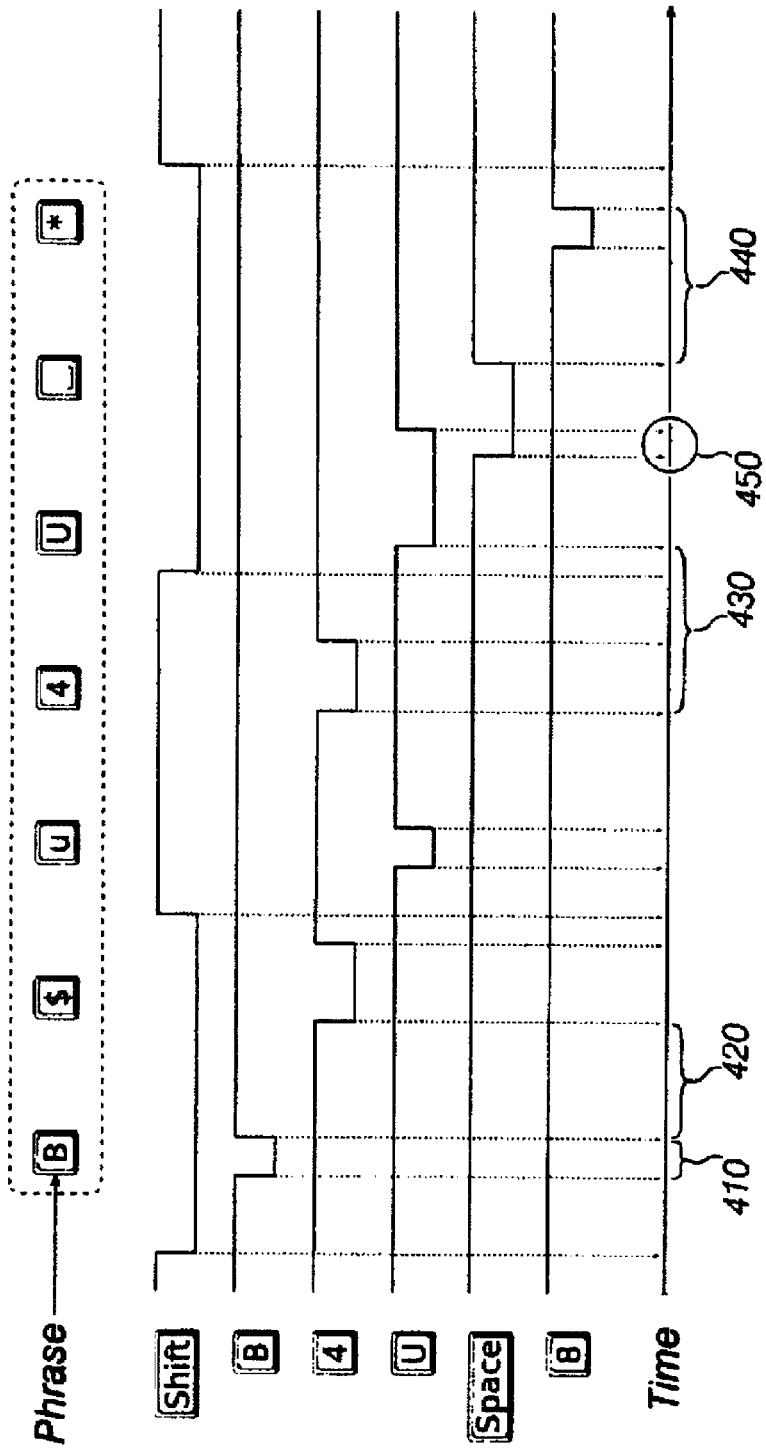
FIG. 4 shows first-order derived measurements that can be computed from the data collected while a user types a phrase.

Times may be given as real ("wall-clock") time (with the resolution and accuracy of a clock available to the system) or as a time relative to a known event such as the most recent system restart. Neither of these times is directly useful for analyzing keystroke dynamics of a user typing a phrase, so an embodiment of the invention computes a first set of derived data based on the collected raw timings. FIG. 4 shows several possible time periods that could be used by an embodiment (based on the same phrase entry key graph shown in FIG. 3). One simple, useful datum that can be computed from the raw keystroke timing data is the length of time a key is depressed 410, the "dwell time." Another useful measure is the time from the release of one key to the depression of the next 420, called the "flight time." Dwell and flight times can efficiently represent all of the key events that occur during the typing of a phrase. Note that flight time may be negative, as shown at 450: the 'U' key was not released until after the "Space" key was pressed, so the "U*Space" flight time is negative.

Other derived measures could also be used by an embodiment. For example, the key-press-to-subsequent-key-press time 430, or key-release-to-subsequent-key-release time 440 also permit the events that occurred during the typing of the phrase to be represented in a useful way. Some embodiments may compute key press and release times relative to the key press event that starts the entry of the phrase, or the key press (or release) event that ends entry of the phrase.

The first set of derived values can be computed trivially by subtraction. Table 2 shows sample dwell values thus computed from the raw key-press and key-release times shown in Table 1:

TABLE 2

| Key | Dwell |
| --- | --- |
| Shift | 1.163952 |
| B | 0.060891 |
| 4 | 0.087878 |
| U | 0.135106 |
| 4 | 0.109772 |
| Shift | 1.304064 |
| U | 0.515032 |
| Space | 0.502073 |
| 8 | 0.043614 |

An embodiment of the invention collects information about the depression and release of keys. Note that modifier dwell times are usually significantly longer than the dwell times of the keys they modify, and may not be as consistent due to variations in modifier key size, shape and location between keyboards. Some embodiments disregard modifier key-press and release events when computing derived values. These values (and ones like them) have been used successfully in the past to create biometric templates and to authenticate users. However, by further processing the first set of derived values to produce a second set of derived values, more keystroke dynamics information about the phrase entry can be exposed and used by an embodiment of the invention to improve a system's performance (e.g., to reduce the false-accept ratio, the false-reject ratio, or both).

One derived measurement that has proven to be particularly effective in improving system performance is the rate of change of key dwell during the entry of the phrase. This derived measurement is called the "dwell tendency." It indicates whether the user is holding keys for longer or shorter periods as the phrase entry proceeds. Thus, a negative dwell tendency means that the user's keypresses are becoming shorter, while a positive dwell tendency means that the user's keypresses are becoming longer. These correspond roughly to faster and slower typing, respectively. Of course, a user's typing speed may vary continuously during the typing of a phrase as a result of key pairs (and longer sequences) that are easier or harder to type. Table 3 shows dwell tendencies corresponding to the dwell times shown in Table 2:

TABLE 3

| Key | Dwell Tendency |
| --- | --- |
| B | |
| 4 | 0.026987 |
| U | 0.047228 |
| 4 | −0.025334 |
| U | 0.405260 |
| Space | −0.012959 |
| 8 | −0.458459 |

It has also been observed experimentally that useful keystroke timing data for templates and authentication can be obtained from second- and third-order derivatives of the keystroke timing data. Template preparation and user authentication may not be significantly improved by the use of fourth- and higher-order derivatives. It is considered that useful keystroke timing data for templates and authentication can be obtained for other features, measurements, and/or calculations based on user keystroke timing data.

In a practical system, each user might have his own phrase, and impostor data would be more difficult to collect and analyze. Also, a practical system would base its enrollment and authentication decisions on several different metrics, not just one. Even though Dwell Tendency and Flight Tendency individually do not characterize or identify a user well, the set including or only having Dwell, Flight, Dwell Tendency and Flight Tendency may be used. Thus, an embodiment may compute Dwell and Flight values, derive Dwell Tendency and Flight Tendency from them, and provide those four values to the template-creation and candidate-authentication processes.

Figure 5:
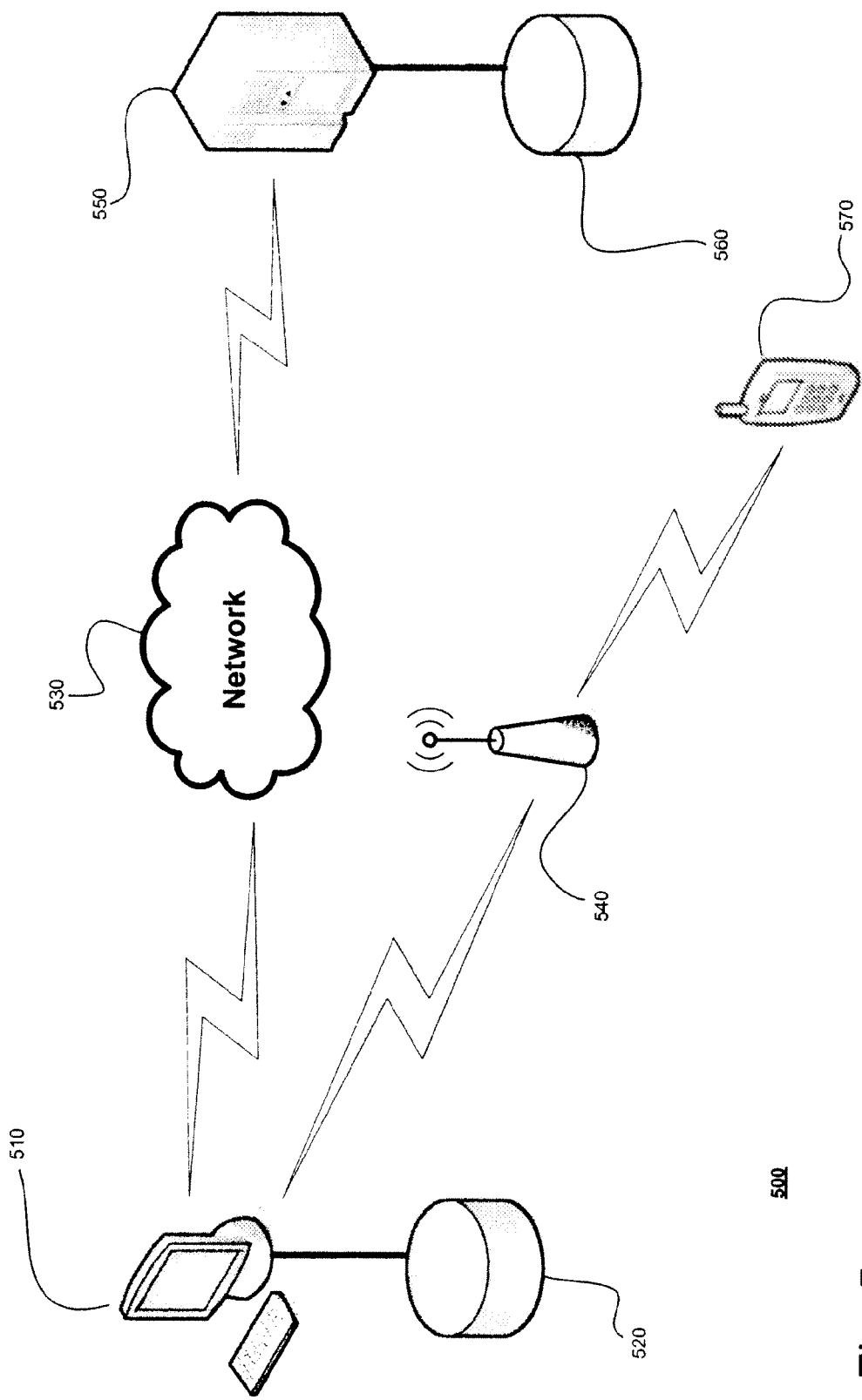
FIG. 5 is a diagram illustrating a computer system for authenticating a user based on a biometric template.

FIG. 5 is an illustration of a computer system 500 that may implement processes described herein (e.g., process 100 and/or 200) for gradual creating of a template based on collected biometric data from a number of user sessions; and/or authenticating a user based on collected biometric data in comparison with a biometric template. A user may be authenticated using a keyboard device on computer system 510. Although the user may use a keyboard device in this embodiment, in an alternate embodiment any suitable input device including a touch pad, touch screen, or tablet PC may be used. Computer system 510 may also include a processor for executing operations related to the authentication process, a communication device for interfacing with server 550 over network 530 and wireless device 570 over wireless access point 540, and storage device 520 that contains the executable instructions that comprise the authentication process. Storage device 520 may also contain a resource that the user is accessing that requires authentication. In one embodiment, computer system 510 may communicate with wireless device 570 to exchange information related to the authentication process. In one embodiment, server 550 includes a communication device to interface with computer system 510 over network 530. Server 550 may also store a resource on storage device 560 that is accessed by the user with computer system 510.

A biometric authentication process has been described to protect or require authentication to access resources based on user input patterns based on user input patterns which are characterized by the collection of timing data of a number of user input samples of a phrase. Further description and definitions are provided below. A resource may include, but is not limited to, one or more user sessions, computer system, computer operating systems, software applications, databases, game applications, communications medium access, email applications, email messages, documents, data, disc drives, directories, files, and the like (e.g., that requires authentication before providing or granting access). Moreover, protection may include denying authorization to a user failing authentication or not authenticated; and/or but providing access to (e.g., allowing login, or logon for) a user passing authentication or successfully authenticated (e.g., a user identified as the creator of or authorized to have access to the resource).

Collecting or detecting timing data may include collecting the input time data point of key-press and key-release events detected during keyboard entry of a plurality of keys included in the phrase. In some cases, timing data may be based on or effected by an input device used by the user during phrase input. For example, the input time data points of key-press and key-release events collected or detected may be based on or effected by the electronics, circuitry, mechanical, physical, electro-mechanical, magnetic characteristics of the input device or switches of the input device.

In addition, timing data may be based on or effected by a user's typing style, such as by being based on or including timing data effected by the user's use of force, pressure, rhythm, physiological factors, behavioral factors, and/or psychological factors while typing (e.g., while typing samples of the phrase). It can be appreciated that for radical or uncomfortable user settings, the timing data may be based on or effected by a user's setting. Such settings include the user's exposure to an certain amount and/or type of noise, moisture, temperature, pressure, smell, vibration, lighting, room size, room occupation, proximity to other people, and/or room wall color. Such settings may also include use of a computer system while the user is standing, in a vehicle, in an airplane, on a train, and the like. A setting may also include whether the user uses the device while the device is setting on the user's lap, or only held in the user's hand. It is considered that a user session may include one or more user settings. For instance, different sessions may be described by different user settings, such as use of a computing device in an office (e.g., the user's office), in a conference room (e.g., full of people), in an airplane, at home, or when using a portable computer without a desk or table.

A biometric template for authenticating a user may be created based on physical and/or behavioral characteristics by collecting and categorizing a user's timing data of the samples (e.g., using statistical operations on timing data of feature input by the user). A measurement of such physical and/or behavioral characteristics may be referred to as the biometric measurements (e.g., features), and may identify a user's typing style (e.g., for at least the phrase). For example, when a user enters a phrase (e.g., a password), the timing data of time durations between key presses and key releases of keystrokes as the user types the password can be construed as a biometric measurement. A biometric template (e.g., a keystroke dynamics template) can be created or calculated based on a number of such biometric measurements (e.g., based on the timing data of the samples). Upon retyping the password, the user can then be identified or authenticated by matching or comparing the biometric measurement (timing data) of the retyped password with those of the template (e.g., for corresponding characters of the phrase). In some embodiments, biometric measurements, timing data, and/or raw samples (e.g. raw data sample, input data, etc.) may be used interchangeably.

Consequently, a template may be used to identify a user's biometric measurements or typing style, at least for the typed phrase. For example, a template may be used to authenticate a user by authenticating that additional collections of timing data are from the user and not from another person, to secure or protect a resource, computer system or data by denying access to another person, but allow access to the user. In some cases, a template may identify, correspond to, or account for only one single user's rhythm, behavior, or physical, or timing of keystrokes during typing of the phrase. For example, a user can be identified or authenticated as the same user as the creator of a template. In some cases, the user may be the only person able to be authenticated for a template. In other cases, the user may be the only person who is statistically likely to be authenticated for a template, such as by being one of a hundred, thousand, ten thousand, hundred thousand, million, or ten million people able to be authenticated for a template.

Also, because biometric measurements can rely on a user's physical and/or behavioral characteristics rather than the secrecy of a passcode, the passcode may no longer be required to remain secretive. When a user is authenticated via a biometric security system, the user's physical and/or behavioral characteristics (e.g., typing style) are measured (e.g., based on the input sample with keystroke timing data) and compared with a predetermined template (e.g., containing keystroke timing data). If there is a match, the user is authenticated (e.g., and is provided access to a resource). In the process of forming the template, the user may be required to enter multiple samples during multiple user session. By processing through an engine, these multiple samples will be transformed into a biometric template. Successful generation of a template over multiple user sessions may be described as gradual user enrollment.

A computer system may include one or more electronic devices, signal processor devices, computing devices, computing systems, laptop computers, portable computers, hand held computer system, cellular phones, client computers, server computers, and the like. In some cases, a computer system may include a processor and a memory to store instructions, that when executed by the processor cause the processor or a computer system to perform operations as described above.

A machine-readable storage medium having stored thereon data and instructions to cause a programmable processor or a computer system to perform operations as described above. For example, some or all blocks of processes 100 and/or 200 may be performed by a system, computer device, or software application calling and/or executing one or more sets of executable instructions or algorithms stored in a memory to performing such operations. In other embodiments, the operations might be performed by specific hardware components that contain hardwired logic. Those operations might alternatively be performed by any combination of programmed computer components and custom hardware components.

Instructions for a programmable processor may be stored in a form that is directly executable by the processor ("object" or "executable" form), or the instructions may be stored in a human-readable text form called "source code" that can be automatically processed by a development tool commonly known as a "compiler" to produce executable code. Instructions may also be specified as a difference or "delta" from a predetermined version of a basic source code. The delta (also called a "patch") can be used to prepare instructions to implement an embodiment of the invention, starting with a commonly-available source code package that does not contain an embodiment.

In the preceding description, numerous details were set forth. It will be apparent, however, to one skilled in the art, that the present invention may be practiced without these specific details. In some instances, well-known structures and devices are shown in block diagram form, rather than in detail, to avoid obscuring the present invention.

Some portions of the detailed descriptions were presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the preceding discussion, it is appreciated that throughout the description, discussions utilizing terms such as "processing" or "computing" or "calculating" or "determining" or "displaying" or the like, refer to the action and processes of a computer system or similar electronic computer device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, compact disc read-only memory ("CD-ROM"), and magnetic-optical disks, read-only memories ("ROMs"), random access memories ("RAMs"), erasable, programmable read-only memories ("EPROMs"), electrically-erasable read-only memories ("EEPROMs"), Flash memories, magnetic or optical cards, or any type of media suitable for storing electronic instructions.

The algorithms and displays presented herein are not inherently related to any particular computer system or other apparatus. Various computer systems or general purpose systems may be used with programs in accordance with the teachings herein, or it may prove convenient to construct more specialized apparatus to perform the required process steps. The required structure for a variety of these systems will appear from the description below. In addition, the present invention is not described with reference to any particular programming language. It will be appreciated that a variety of programming languages may be used to implement the teachings of the invention as described herein.

The applications of the present invention have been described largely by reference to specific examples and in terms of particular allocations of functionality to certain hardware and/or software components. However, those of skill in the art will recognize that improved keystroke dynamic authentication can also be achieved by software and hardware that distribute the functions of embodiments of this invention differently than herein described. Such variations and implementations are understood to be captured according to the following claims.

What is claimed is:

1. A method comprising:
    collecting keystroke timing data of a plurality of samples of a phrase input by a first user on an input device during a plurality of different sessions by the first user; and
    creating a biometric user template based on the timing data collected during the plurality of different sessions by the first user, wherein the plurality of different sessions by the first user are distinguished by each session being associated with the user being at a different location.

2. The method of claim 1, further comprising authenticating the first user for each session using a non-biometric authentication and non-keystroke timing, wherein the timing data includes a phrase input by the user during the non-biometric non-keystroke timing authentication.

3. The method of claim 2, wherein non-biometric authentication comprises a one time password, a knowledge based password, or a knowledge based authentication.

4. The method of claim 2, wherein the non-biometric authentication comprises communicating a pass key or a question to the first user, which the first user must answer correctly with the phrase.

5. The method of claim 1, wherein collecting comprises:
collecting keystroke timing data of at least one sample of a single phrase input by the first user on an input device during a first session by the first user; then
logging the first user off of the input device; and then
collecting subsequent keystroke timing data of at least one additional sample of the same phrase input by the first user on a different input device during a second different session by the first user; and
wherein creating comprises:
retrieving incomplete biometric user template data based on the timing data collected during the first session, and completing the incomplete biometric user template by collecting the at least one additional sample to provide identification of the user, and incorporating the incomplete biometric user template data with the subsequent keystroke timing data to create a complete biometric user template that includes a sufficient amount of samples to provide identification of the first user.

6. The method of claim 5, wherein the second different session comprises collecting the subsequent keystroke timing data for the same user in a different setting, at a different computer system, or at a different input device; and further comprising authenticating the first user using the complete template.

7. The method of claim 5, wherein creating a complete biometric user template comprises calculating center vectors based on averages of the keystroke timing data of features of the phrase collected during the first and second sessions, and calculating variability vectors proportional to standard deviations from the center vectors based on the keystroke timing data of features of the phrase collected during the first and second sessions.

8. The method of claim 7, wherein incorporating comprises incorporating the subsequent keystroke timing data into the template by recalculating the center vectors based on averages of vectors of the subsequent keystroke timing data of features of the phrase collected during the second session, and recalculating variability vectors proportional to standard deviations from the center vectors based on the subsequent keystroke timing data of features of the phrase collected during the second session.

9. The method of claim 1, wherein the timing data comprises an input time data point of key-press and key-release events collected during keyboard entry of at least five keys included in a sample of the phrase, wherein the sample excludes a backspace or delete key entry.

10. The method of claim 1, wherein the different sessions are defined by authenticating a user within a period of time, or using a single computer system.

11. The method of claim 1, wherein creating a biometric user template comprises calculating a plurality of timing differences between input time data points of key-presses events collected for adjacent keys of the phrase, and calculating a plurality of timing differences between input time data points of key-presses and key-release events collected for each of a number of keys of the phrase to identify the user's biometric measurements for the typed phrase.

12. The method of claim 1, wherein the different user sessions are defined by different authentications of the first user, by the first user using different computer systems, or by the first user in different settings.

13. The method of claim 1, wherein the different sessions by the first user are distinguished by the first user being in only a single setting during each session.

14. The method of claim 1, wherein the different sessions by the first user are defined by authenticating the first user within less than 10 minutes.

15. The method of claim 1, wherein the different user sessions by the first user are each completed prior to a subsequent (1) power off, power down, sleep mode, reboot, power on, reset, entering low power mode of a computer system; or (2) log out, log off, log in, log on of an application.

16. The method of claim 1, wherein each of the plurality of different sessions by the first user include the first user being at a different location than each other session of the plurality of different sessions.

17. The method of claim 1, wherein the first user is at different locations for each of the plurality of different sessions.

18. The method of claim 1, wherein each of the plurality of different sessions by the first user include the first user being at a first location during for a first session of the plurality of different sessions and the first user being at a second location that is different than the first location during a second session of the plurality of different sessions.

19. A method comprising:
collecting first keystroke timing data of a first plurality of samples of a phrase input by a first user on at least one input device during a first plurality of sessions;
creating incomplete biometric user template data based on the first keystroke timing data, wherein the incomplete template is insufficient to provide bio-authentication of the first user; then
collecting subsequent second keystroke timing data of at least one additional sample of the phrase input by the first user on an input device during a second different session;
modifying the incomplete biometric user template data using the subsequent keystroke timing data to create a complete biometric user template that is sufficient to provide bio-authentication of the first user, wherein the plurality of different sessions by the first user are distinguished by each session being associated with the user being at a different location.

20. The method of claim 19, further comprising authenticating the first user for each session using a non-biometric authentication, wherein the timing data includes a password input by the first user during the non-biometric authentication.

21. The method of claim 19, wherein the second different session comprises collecting the subsequent second keystroke timing data for the same user in a different setting, at a different computer system, or at a different input device.

22. The method of claim 19, wherein modifying includes calculating key dwell times and key flight time vectors using the first and subsequent keystroke timing data of key-press and key-release events of the samples.

23. The method of claim 22, wherein a session is defined by a period of time less than a predetermined threshold, and the first user's successfully non-bio authentication to access a resource.

24. A non-transitory computer-readable medium storing data and instructions to cause a programmable processor to perform operations comprising:
  collecting keystroke timing data of a plurality of samples of a phrase input by a first user on an input device during a plurality sessions; and
  creating a biometric user template based on the timing data collected during the plurality of sessions, wherein the plurality of different sessions by the first user are distinguished by each session being associated with the user being at a different location.

25. The computer-readable medium of claim 24, including further operations comprising:
  authenticating the first user for the plurality of sessions using a non-biometric authentication, wherein the timing data includes a phrase input by the first user during the non-biometric authentication.

26. The computer-readable medium of claim 24, wherein collecting comprises:
  collecting keystroke timing data of at least one sample of a phrase input by the first user on an input device during a first session, and collecting subsequent keystroke timing data of at least one additional sample of the phrase input by the first user on an input device during a second different session; and
  wherein creating comprises:
  retrieving incomplete biometric user template data based on the timing data collected during the first session, and completing the incomplete biometric user template by collecting the at least one additional sample to provide identification of the first user, and incorporating the incomplete biometric user template data with the subsequent keystroke timing data to create a complete biometric user template that includes a sufficient amount of samples to provide identification of the first user.

27. The computer-readable medium of claim 26, wherein the second different session comprises collecting keystroke timing data from the first user in a different setting, on a different computer system, or at a different input device.

28. The computer-readable medium of claim 26, wherein creating a complete biometric user template comprises calculating center vectors based on averages of the keystroke timing data of features of the phrase collected during the first and second sessions, and calculating variability vectors proportional to standard deviations from the center vector based on the keystroke timing data of features of the phrase collected during the first and second sessions.

* * * * *